(12) United States Patent
Chen et al.

(10) Patent No.: US 12,308,052 B2
(45) Date of Patent: May 20, 2025

(54) PRODUCE THINNER DTS AND ADJUSTABLE CAPACITANCE FOR TDMR HEADS

(71) Applicant: Western Digital Technologies, Inc., San Jose, CA (US)

(72) Inventors: Fang Chen, Livermore, CA (US); Chih-Ching Hu, Pleasanton, CA (US); Yung-Hung Wang, San Jose, CA (US); Chen-Jung Chien, Mountain View, CA (US); Ming Mao, Dublin, CA (US); Ming Jiang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/228,517

(22) Filed: Jul. 31, 2023

(65) Prior Publication Data

US 2024/0347073 A1  Oct. 17, 2024

Related U.S. Application Data

(60) Provisional application No. 63/459,227, filed on Apr. 13, 2023.

(51) Int. Cl.
*G11B 5/39* (2006.01)
*G11B 5/235* (2006.01)
*G11B 5/31* (2006.01)

(52) U.S. Cl.
CPC ............ *G11B 5/3912* (2013.01); *G11B 5/235* (2013.01); *G11B 5/3954* (2013.01);
(Continued)

(58) Field of Classification Search
None
See application file for complete search history.

(56) References Cited

U.S. PATENT DOCUMENTS 5,701,222 A * 12/1997 Gill et al. ............ G11B 5/3948
360/314
6,542,321 B1 * 4/2003 Molstad et al. ......... G11B 5/02
360/31
(Continued)

FOREIGN PATENT DOCUMENTS

EP  4049272 A1  8/2022

OTHER PUBLICATIONS

Wood, Roger, "Shingled Magnetic Recording (SMR) and Two-Dimensional Magnetic Recording (TDMR)", Journal of Magnetism and Magnetic Materials, vol. 561, Nov. 2022, pp. 1-32.

*Primary Examiner* — Craig A. Renner
(74) *Attorney, Agent, or Firm* — PATTERSON + SHERIDAN, LLP

(57) ABSTRACT

The present disclosure generally relates to a dual free layer two dimensional magnetic recording read head. The read head comprises a first lower shield, a first sensor disposed over the first lower shield, a first upper shield disposed over the first sensor, a read separation gap (RSG) disposed on the first upper shield, a second lower shield disposed on the RSG, a second sensor disposed over the second lower shield, and a second upper shield disposed over the second sensor. In one embodiment, the RSG comprises $SiO_2$ and has a thickness of about 7 nm to about 14 nm. The $SiO_2$ isolates the first sensor from the second sensor, and is a chemical mechanical processing (CMP) stop layer. In another embodiment, the RSG comprises a first sublayer comprising AlOx and a second sublayer comprising $SiO_2$. The thicknesses of the first and second sublayers are based on an adjustable capacitance.

20 Claims, 5 Drawing Sheets

(52) U.S. Cl.
CPC ............ *G11B 5/3116* (2013.01); *G11B 5/398* (2013.01); *G11B 2005/3996* (2013.01)

(56) References Cited

U.S. PATENT DOCUMENTS

| | | |
|---|---|---|
| 8,891,207 B1 | 11/2014 | Li et al. |
| 8,908,333 B1* | 12/2014 | Rudy et al. .......... G11B 5/3912 |
| | | 360/319 |
| 9,042,058 B1 | 5/2015 | Li et al. |
| 9,087,527 B1* | 7/2015 | Li et al. ............... G11B 5/3958 |
| 9,269,383 B1 | 2/2016 | Hattori et al. |
| 9,324,342 B2 | 4/2016 | Sapozhnikov et al. |
| 9,361,910 B2 | 6/2016 | McKinlay et al. |
| 9,401,163 B2 | 7/2016 | McKinlay et al. |
| 9,437,251 B1 | 9/2016 | Rudy et al. |
| 9,536,549 B1* | 1/2017 | Ge et al. ............... G11B 5/3912 |
| 9,679,591 B1 | 6/2017 | Hao et al. |
| 2015/0140685 A1* | 5/2015 | Watanabe et al. ... G11B 5/3958 |
| | | 438/3 |
| 2017/0256276 A1* | 9/2017 | Hiraki et al. ........ G11B 5/3951 |
| 2021/0390978 A1 | 12/2021 | Hu et al. |
| 2024/0144966 A1* | 5/2024 | Mao et al. ........... G11B 5/3912 |

\* cited by examiner

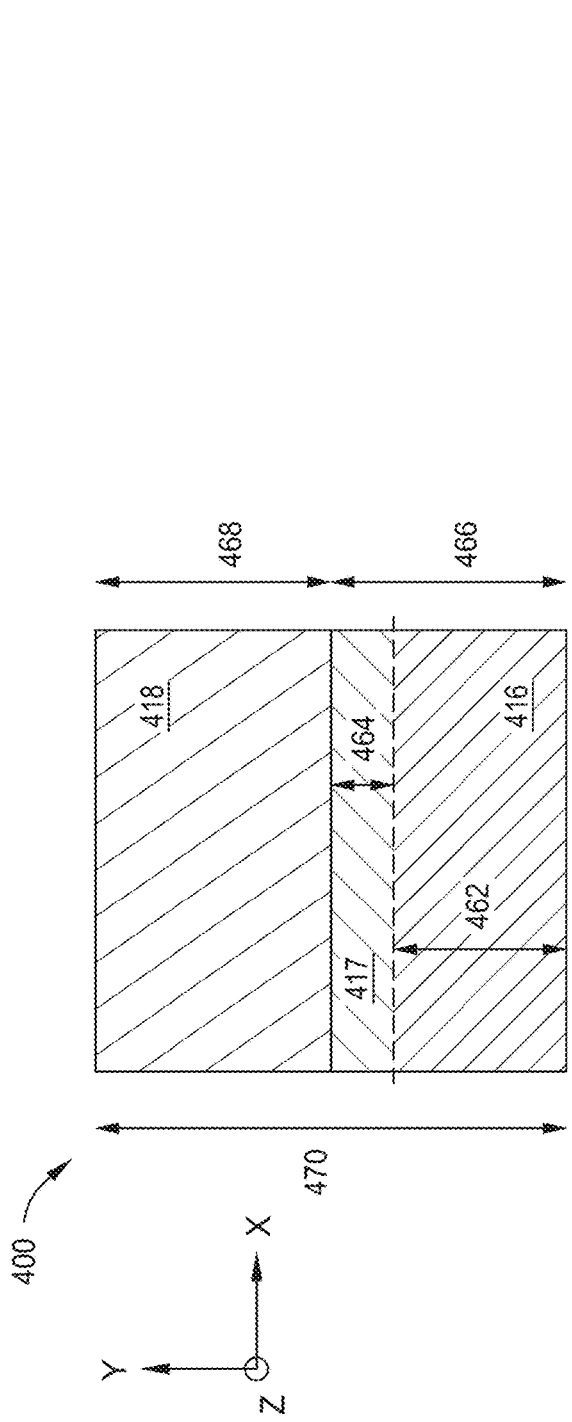
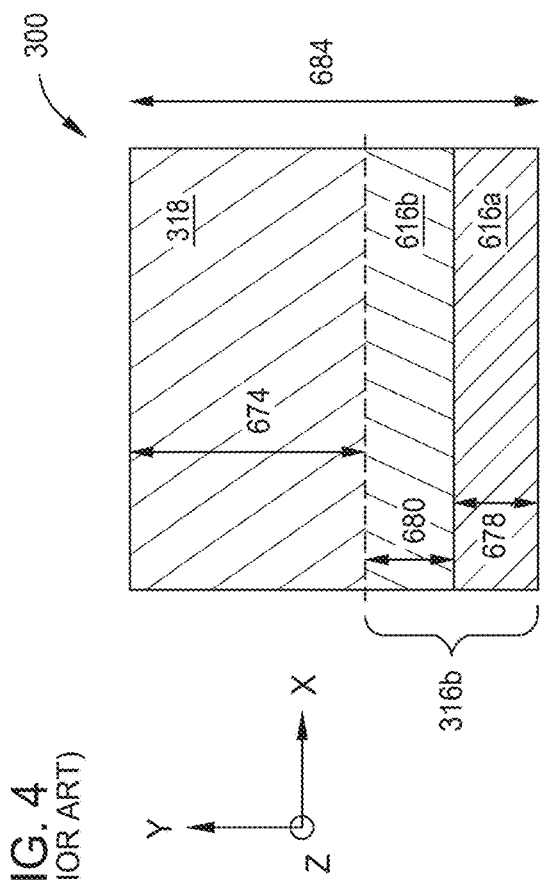
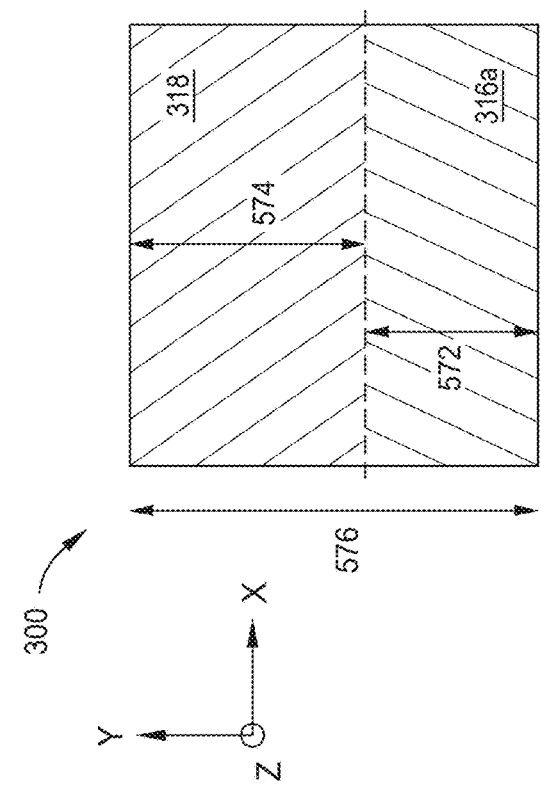
FIG. 4 (PRIOR ART)
FIG. 5
FIG. 6

PRODUCE THINNER DTS AND ADJUSTABLE CAPACITANCE FOR TDMR HEADS

CROSS-REFERENCE TO RELATED APPLICATIONS

This application claims benefit of U.S. provisional patent application Ser. No. 63/459,227, filed Apr. 13, 2023, which is herein incorporated by reference.

BACKGROUND OF THE DISCLOSURE

Field of the Disclosure

Embodiments of the present disclosure generally relate to a dual free layer (DFL) two dimensional magnetic recording (TDMR) read head.

Description of the Related Art

Two dimensional magnetic recording (TDMR) read heads generally have a first sensor, oftentimes referred to as a lower reader, and a second sensor, oftentimes referred to as an upper reader. The readers each have lower and upper shields with an insulating reader separation gap (RSG) therebetween. Both the upper reader and the lower reader are substantially identical, each comprising two free layers to be dual free layer (DFL) readers or sensors. In DFL reader operation, the two free layers of each reader are individually stabilized longitudinally by an anti-ferromagnetically coupled (AFC) soft bias (SB) and biased transversally by a permanent magnet or a rear hard bias (RHB) structure from the stripe back edge of the sensor.

A middle shield between the upper and lower readers in TDMR read heads serves as both a top shield for the lower reader and a bottom lead for the upper reader. The middle shield contributes to down track spacing (DTS) physically, upper reader performance stability magnetically, and lead resistance electrically. The large topography of the lower reader and deep over milling (OM) of the upper reader, specifically from a TDMR dual free layer read head, result in an uneven middle shield with varying magnetic shield thicknesses. AlOx and Ru have been used before forming the middle shield for isolation and seed layer purposes, respectively; however, using both AlOx and Ru increases the DTS, when the collective thickness contribution of AlOx and Ru is large.

Therefore, there is a need in the art for an improved TDMR read head.

SUMMARY OF THE DISCLOSURE

The present disclosure generally relates to a dual free layer two dimensional magnetic recording read head. The read head comprises a first lower shield, a first sensor disposed over the first lower shield, a first upper shield disposed over the first sensor, a read separation gap (RSG) disposed on the first upper shield, a second lower shield disposed on the RSG, a second sensor disposed over the second lower shield, and a second upper shield disposed over the second sensor. In one embodiment, the RSG comprises $SiO_2$ and has a thickness of about 3 nm to about 25 nm. The $SiO_2$ isolates the first sensor from the second sensor, and is a chemical mechanical processing (CMP) stop layer. In another embodiment, the RSG comprises a first sublayer comprising AlOx and a second sublayer comprising $SiO_2$. The thicknesses of the first and second sublayers are based on an adjustable capacitance while $SiO_2$ functions as a CMP stop layer and partial RSG.

In one embodiment, a read head comprises a first lower shield, a first sensor disposed over the first lower shield, a first upper shield disposed over the first sensor, a read separation gap disposed on the first upper shield, the read separation gap comprising $SiO_2$, wherein the read separation gap has a thickness of about 3 nm to about 25 nm, a second lower shield disposed on the read separation gap, a second sensor disposed over the second lower shield, and a second upper shield disposed over the second sensor.

In another embodiment, a read head comprises a first lower shield, a first sensor disposed over the first lower shield, a first upper shield disposed over the first sensor, a read separation gap disposed on the first upper shield, the read separation gap comprising a first sublayer comprising AlOx, where x is an integer greater than or equal to 1, disposed in contact with the first upper shield and a second sublayer comprising $SiO_2$ disposed in contact with the first sublayer, wherein the read separation gap has a thickness of about 3 nm to about 25 nm, a second lower shield disposed in contact with the second sublayer of the read separation gap, a second sensor disposed over the second lower shield, and a second upper shield disposed over the second sensor.

In yet another embodiment, a read head comprises a first lower shield, a first sensor disposed over the first lower shield, a first upper shield disposed over the first sensor, a read separation gap disposed on the first upper shield, the read separation gap comprising a first sublayer comprising AlOx, where x is an integer greater than or equal to 1, disposed in contact with the first upper shield and a second sublayer comprising $SiO_2$ disposed in contact with the first sublayer, wherein the read separation gap has a thickness less than about 25 nm, and wherein the second sublayer has a first thickness equal to or greater than about 3 nm, a second lower shield disposed in contact with the second sublayer of the read separation gap, a second sensor disposed over the second lower shield, and a second upper shield disposed over the second sensor, wherein a capacitance of the read head is adjustable based on an equation of: $C_{total} = C_{SiO2} + C_{AlOx} = (\epsilon A/d)_{SiO2} + (\epsilon A/d)_{AlOx}$, where $C_{total}$ is a total capacitance of the read head, $C_{SiO2}$ is a capacitance of $SiO_2$, $C_{AlOx}$ is a capacitance of AlOx, $\epsilon$ is a permittivity of $SiO_2$ or AlOx, A is an area of the first sublayer or the second sublayer, and d is a thickness of the first sublayer or the second sublayer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates a RSG, a seed layer, and a middle shield of a conventional DFL TDMR read head.

FIG. 5 illustrates a RSG and the middle shield of the DFL TDMR read head of FIGS. 3A-3B, according to one embodiment.

FIG. 6 illustrates a RSG and the middle shield of the DFL TDMR read head of FIGS. 3A-3B, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a dual free layer two dimensional magnetic recording read head. The read head comprises a first lower shield, a first sensor disposed over the first lower shield, a first upper shield disposed over the first sensor, a read separation gap (RSG) disposed on the first upper shield, a second lower shield disposed on the RSG, a second sensor disposed over the second lower shield, and a second upper shield disposed over the second sensor. In one embodiment, the RSG comprises $SiO_2$ and has a thickness of about 3 nm to about 25 nm. The $SiO_2$ isolates the first sensor from the second sensor, and is a chemical mechanical processing (CMP) stop layer. In another embodiment, the RSG comprises a first sublayer comprising AlOx and a second sublayer comprising $SiO_2$. The thicknesses of the first and second sublayers are based on an adjustable capacitance.

Figure 1:
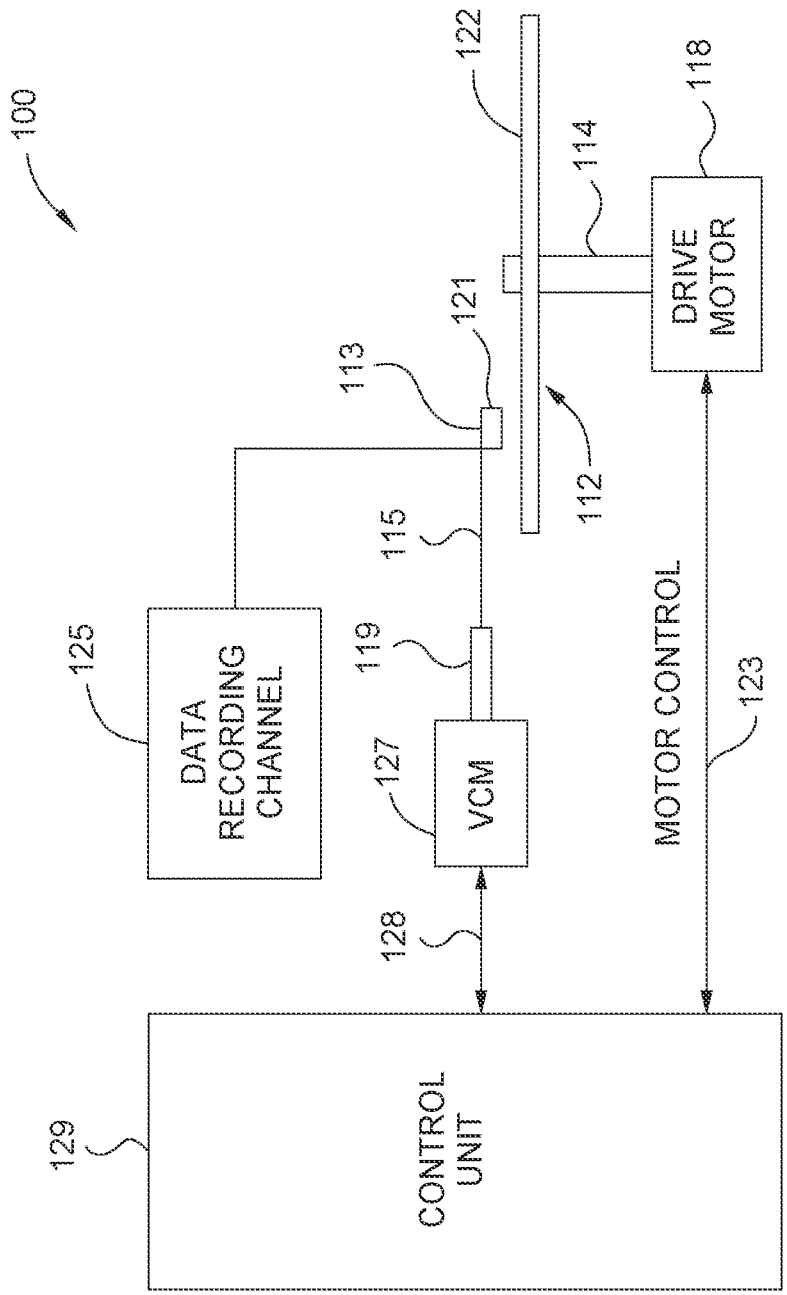
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
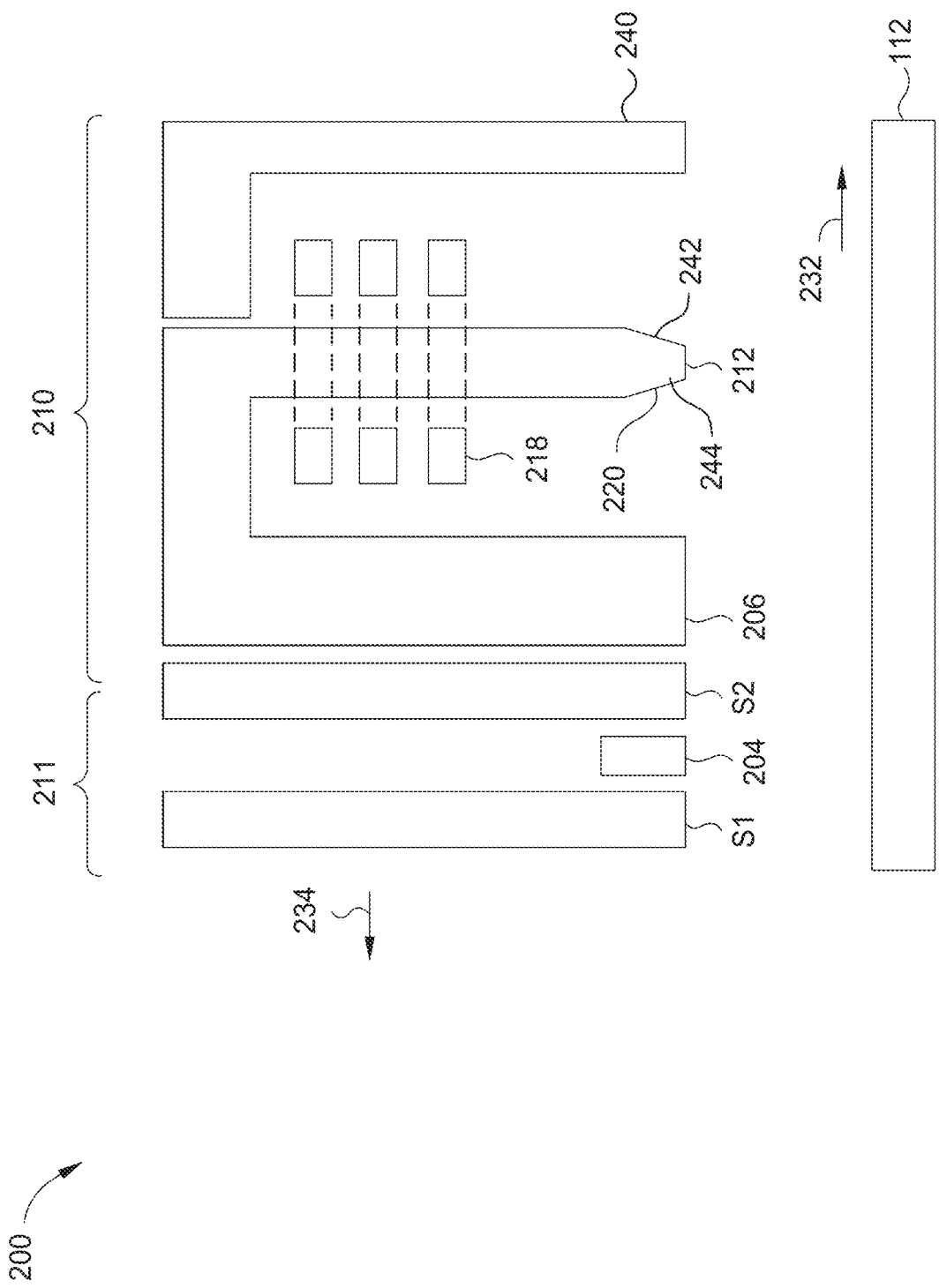
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magnetoresistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits. Here, magnetic read head 211 is a simplified representation of the various disclosed embodiments which will include multiple sensing elements and shields as further described below.

The head assembly 200 includes a write head 210. In one embodiment, which can be combined with other embodiments, the write head 210 includes a main pole 220, a leading shield 206, a trailing shield (TS) 240, and an optional spintronic device disposed between the main pole 220 and the TS 240. The main pole 220 serves as a first electrode. Each of the main pole 220, the spintronic device, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap.

Figure 3A:
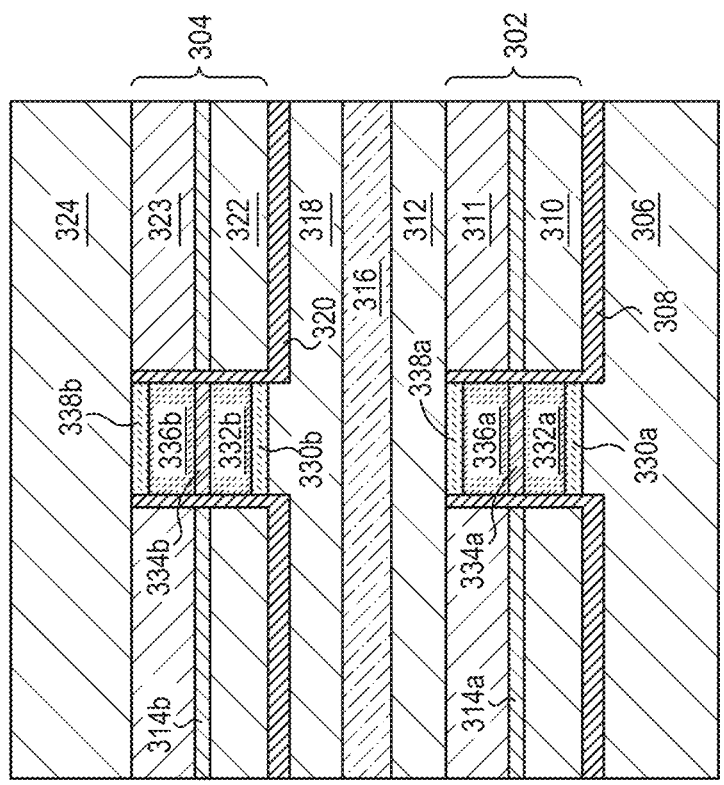
FIGS. 3A-3B illustrate various views of a conventional dual free layer (DFL) two dimensional magnetic recording (TDMR) read head comprising two sensors or readers, according to one embodiment.
Figure 3B:
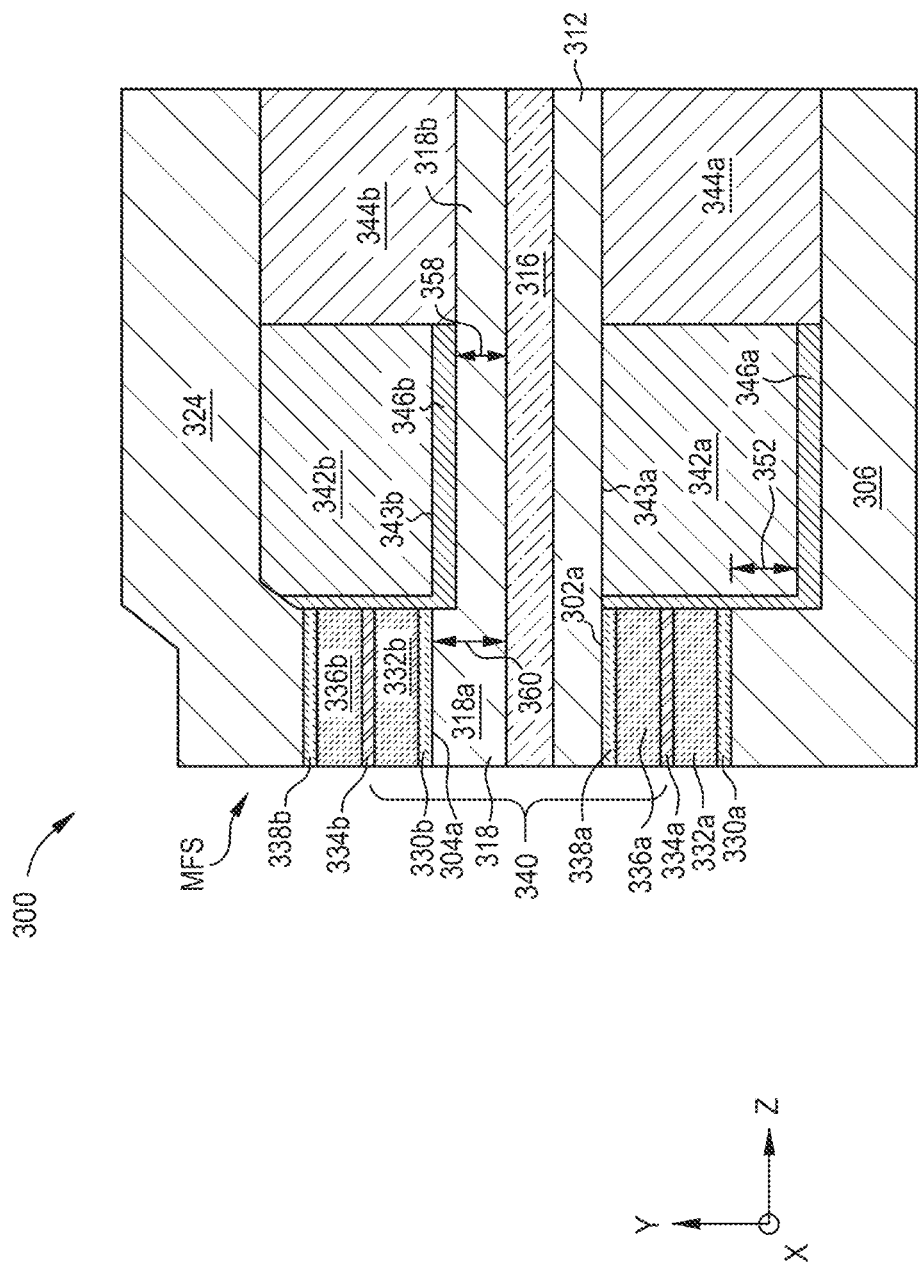

FIGS. 3A-3B illustrate various views of a conventional dual free layer (DFL) two dimensional magnetic recording (TDMR) read head 300 comprising two sensors or readers 302, 304, according to one embodiment. FIG. 3A illustrates a media facing surface (MFS) view of the DFL TDMR read head 300, and FIG. 3B illustrates a cross-sectional view of the DFL TDMR read head 300.

The DFL TDMR read head 300 comprises a first lower shield 306, a first insulation layer 308 disposed on the first lower shield 306, a first sensor or reader 302 disposed on the first lower shield 306 between portions of the first insulation layer 308, a first upper shield 312 disposed over the first sensor 302, a read separation gap (RSG) 316 disposed on the first upper shield 312, a second lower shield 318 disposed on the RSG 316 a second insulation layer 320 disposed on the second lower shield 318, a second sensor or reader 304 disposed on the second lower shield 318 between portions of the second insulation layer 320, and a second upper shield 324 disposed over the second sensor 304. The second lower shield 318 may be referred to herein as a middle shield 318.

The RSG 316 may comprise $SiO_2$, AlOx, where x is an integer greater than or equal to 1, or a combination thereof, as discussed further below in FIGS. 5-6. The first and second sensors 302, 304 may each individually be tunnel magnetoresistance (TMR) sensors or magnetic tunnel junction (MTJ) sensors. The first and second sensors 302, 304 may be interchangeably referred to as a first reader 302 and a second reader 304 throughout.

The first reader 302 comprises a seed layer 330a, a first free layer 332a disposed on the seed layer 330a, a barrier layer 334a disposed on the first free layer 332a, a second free layer 336a disposed on the barrier layer 334a, and a cap layer 338a disposed on the second free layer 336a. The second reader 304 comprises a seed layer 330b, a first free layer 332b disposed on the seed layer 330b, a barrier layer 334b disposed on the first free layer 332b, a second free layer 336b disposed on the barrier layer 334b, and a cap layer 338b disposed on the second free layer 336b.

A first soft bias layer 310 is disposed on the first insulation layer 308 for the first reader 302 and an anti-ferromagnetically coupled (AFC) layer 314a is disposed between the first soft bias layer 310 and a second soft bias layer 311. Similarly, a first soft bias layer 322 is disposed on the first insulation layer 320 for the second reader and an AFC layer 314b is disposed between the first soft bias layer 322 and a second soft bias layer 323. The first upper shield 312 and the second upper shield 324 may each individually comprise a magnetic material similar to the soft bias material, such as NiFe, NiFe/CoFe laminates, NiFe/NiFeCr laminates, or NiFe/W laminates, for example ("/" as used here denotes separate layers in a multi-layer stack). The first upper shield 312 and the second upper shield 324 may also each individually comprise a magnetic material similar to the soft bias material exchange biased by an antiferromagnet, such as IrMn, IrCrMn. The first upper shield 312 and the second upper shield 324 connect seamlessly to the second soft bias layers 311, 323, respectively. The first insulation layer 308 extends in the y-direction on each side of the first sensor 302 to prevent the first sensor 302 from contacting the first soft bias layer 310, the AFC layer 314a, and the second soft bias layer 311. Similarly, the first insulation layer 320 extends in the y-direction on each side of the second sensor 304 to prevent the second sensor 304 from contacting the second soft bias layer 323, and the AFC layer 314b, and the second soft bias layer 323. The AFC layers 314a and 314b comprise a CoFe/Ru/CoFe tri-layer.

As shown in FIG. 3B, a down-track spacing (DTS) 340 between the first barrier layer 334a of the first sensor 302 and the second barrier layer 334b of the second sensor 304 is about 50 nm to about 150 nm. A first rear hard bias (RHB) structure 342a is disposed behind the first reader 302, recessed from the MFS in the z-direction. A second insulation layer 346a is disposed between the first RHB structure 342a and the first reader 302, and between the first RHB structure 342a and the first lower shield 306. A third insulation layer 344a is disposed behind the first RHB structure 342a. The first, second, and third, insulation layers 308, 346a, and 344a may each individually comprise MgO, AlOx, SiNx, SiOx and their laminates, where x is an integer greater than or equal to 1.

A first surface 343a of the first RHB structure 342a disposed adjacent to the first upper shield 312 is substantially flush or aligned with a first surface 302a of the first reader 302. In other words, the first RHB structure 342a and the second insulating layer 346a are substantially flush or aligned with the top surface 302a of the cap layer 338a of the first sensor 302 in the z-direction. The first RHB structure 342a of the read head 300 is recessed into the first lower shield 306 a distance 352 of about 15 nm to about 20 nm. Because the first RHB structure 342a is substantially flush or aligned with the first reader 302, the first upper shield 312 and the RSG 316 each extends substantially linearly along the x/z-axis from the MFS into the read head 300 such that the first upper shield 312 and the RSG 316 are planar.

A second RHB structure 342b is disposed behind the second reader 304, recessed from the MFS in the z-direction. A second insulation layer 346b is disposed between the second RHB structure 342b and the second reader 304, and between the second RHB structure 342b and the second lower shield 318. The third insulation layer 344b is disposed behind the second RHB structure 342b. A first surface 343b of the second RHB structure 342b is substantially flush or aligned with a first surface 304a of the second reader 304 in the z-direction. In other words, the second RHB structure 342b is substantially flush or aligned with the bottom surface 304a of the seed layer 330b of the second sensor 304 in the z-direction.

Additionally, because the first upper shield 312 and the RSG 316 of the DFL TDMR read head 300 are each planar or extend substantially linearly along the z-axis, the second lower shield 318 comprises two portions of varying thicknesses. A first portion 318a of the second lower shield 318 disposed at the MFS adjacent to the second reader 304 has a first thickness 360 in the y-direction of about 20 nm to about 30 nm, and a second portion 318b of the second lower shield 318 disposed between the RSG 316 and the second insulation layer 344b has a second thickness 358 in the y-direction of greater than or equal to about 10 nm, such as about 15 nm to about 20 nm.

FIG. 4 illustrates a RSG 416, a seed layer 417, and a middle shield 418 of a conventional DFL TDMR read head 400. While only a portion of the conventional DFL TDMR read head 400 is shown, the DFL TDMR read head 400 may be similar to the DFL TDMR read head 300 of FIGS. 3A-3B; however, the DFL TDMR read head 400 comprises a seed layer 417 disposed between the RSG 416 and the middle shield 418. Thus, for clarity, aspects of FIGS. 3A-3B may be referred to herein when describing FIG. 4. For example, the RSG 416 may be disposed over the first reader 302, the seed layer 417 is disposed on the RSG 416, and the middle shield 418 is disposed between the seed layer 417 and the second reader 304.

In the DFL TDMR read head 400, the RSG 416 comprises AlOx, where x is an integer greater than or equal to 1. The RSG 416 has a thickness in the y-direction of about 5 nm to about 30 nm before an etch process is performed to flatten the RSG 416, and a thickness 462 in the y-direction of about 3 nm to about 25 nm after the etch process has been performed. The seed layer 417 comprises Ru and has a thickness 464 in the y-direction of about 1 nm to about 5 nm. Thus, a collective thickness 466 of the RSG 416 and the seed layer 417 is about 4 nm to about 30 nm after etching, such as about 15 nm or greater. The middle shield 418 may comprise a single layer or a multilayer structure and has a thickness 468 in the y-direction of about 10 nm to about 50 nm. For example, the middle shield 418 may comprise one or more of NiFe, CoB, CoFe, CoHf, IrMn, NiCr, Co, Hf, Mg, Ru, Ta, and Ti. As such, the RSG 416, the seed layer 417, and the middle shield 418 collectively have a thickness 470 in the y-direction of about 15 nm to about 80.

The RSG 416 comprising AlOx isolates the first reader 302 from the second reader 304. The seed layer 417 comprising Ru acts as a chemical mechanical processing (CMP) stop layer to protect the electrical isolation of the RSG 416. However, due to the seed layer 417, a DTS (not shown) of the DFL TDMR read head 400 is greater than the DTS 340 of FIGS. 3A-3B. If the thickness 464 of the seed layer 417 is reduced, the seed layer 417 may not function properly as a CMP stop layer, resulting in portions of the RSG 416 being polished away. If portions of the RSG 416 are polished away, the RSG 416 may fail to fully isolate the first reader 302 from the second reader 304, and the topography of the RSG 416 may be uneven, causing the second lower shield 318 and/or second reader 304 to be uneven.

FIG. 5 illustrates a RSG 316a and the middle shield 318 of the DFL TDMR read head 300 of FIGS. 3A-3B, according to one embodiment. For clarity, only a portion of the DFL TDMR read head 300 is shown; however, FIG. 5 is used in combination with FIGS. 3A-3B. The RSG 316a is the RSG 316 of FIGS. 3A-3B.

As shown in FIG. 5, the middle shield 318 is disposed directly on and in contact with the RSG 316a. The RSG 316a comprises $SiO_2$ and has a thickness 572 in the y-direction of about 3 nm to about 25 nm. The $SiO_2$ of the RSG 316a acts as a CMP stop layer and further isolates the first reader 302 from the second reader 304. Thus, a seed layer, such as Ru, is not needed.

The middle shield 318 may comprise a single layer or a multilayer structure and has a thickness 574 in the y-direction of about 10 nm to about 50 nm. For example, the middle shield 318 may comprise one or more of NiFe, CoB, CoFe, CoHf, IrMn, NiCr, Co, Hf, Mg, Ru, Ta, and Ti. Thus, the RSG 316a and the middle shield 318 collectively have a thickness 576 in the y-direction of about 13 nm to about 75 nm. Thus, as compared to the DFL TDMR read head 400 of FIG. 4, the thickness 576 is about 2 nm to about 5 nm less than the thickness 470. As such, the DTS 340 of the DFL TDMR read head 300 is less than the DTS of the DFL TDMR read head 400.

FIG. 6 illustrates a RSG 316b and the middle shield 318 of the DFL TDMR read head 300 of FIGS. 3A-3B, according to another embodiment. For clarity, only a portion of the DFL TDMR read head 300 is shown; however, FIG. 6 is used in combination with FIGS. 3A-3B. The RSG 316b is the RSG 316 of FIGS. 3A-3B.

As shown in FIG. 6, the middle shield 318 is disposed directly on and in contact with the RSG 316b. The RSG 316b comprises a first sublayer 616a and a second sublayer 616b. The first sublayer 616a is disposed on the first upper shield 312 and comprises an insulating material, such as AlOx, where x is an integer greater than or equal to 1. The second sublayer 616b is disposed on the first sublayer 616a and comprises $SiO_2$. The $SiO_2$ of the second sublayer 616b acts as a CMP stop layer and further isolates the first reader 302 from the second reader 304. Thus, a seed layer, such as Ru, is not needed. The middle shield 318 is disposed on the second sublayer 616b. The middle shield 318 may comprise a single layer or a multilayer structure and has a thickness 674 in the y-direction of about 10 nm to about 50 nm. For example, the middle shield 418 may comprise one or more of NiFe, CoB, CoFe, CoHf, IrMn, NiCr, Co, Hf, Mg, Ru, Ta, and Ti.

The first sublayer 616a has a thickness 678 in the y-direction, and the second sublayer 616b has a thickness 680 in the y-direction. The thicknesses 678 and 680 of the first and second sublayers 616a, 616b are variable to provide an adjustable capacitance of the DFL TDMR read head 300, as AlOx and/or $SiO_2$ have different dielectric constants. In other words, the thicknesses 678 and 680 of the first and second sublayers 616a, 616b are determined based on a desired capacitance of the DFL TDMR read head 300.

However, the thickness 680 of the second sublayer 616b should be equal to or greater than about 3 nm in order to function as a CMP stop layer.

To select a desired capacitance, and thus the thicknesses 678 and 680 of the first and second sublayers 616a, 616b, Equation 1 can be used:

$$C_{total} = C_{SiO2} + C_{AlOx} = \left(\frac{\epsilon \cdot A}{d}\right)_{SiO2} + \left(\frac{\epsilon \cdot A}{d}\right)_{AlOx} \quad \text{Equation 1}$$

In Equation 1, C is the capacitance, e is the permittivity of the dielectric material (i.e., of AlOx and/or $SiO_2$), A is the area of the plates or layers, and d is the separation between the plates or the thickness of AlOx and/or $SiO_2$ layers. Thus, by inserting the desired total capacitance ($C_{total}$), a collective known total thickness of AlOx and/or $SiO_2$, the known permittivity of AlOx and/or $SiO_2$, and the area of the AlOx and/or $SiO_2$ layers, the individually capacitances and thus, the thicknesses 678 and 680, of the first and second sublayers 616a, 616b can be determined.

In some embodiments, the collective thickness of the RSG 316b is about 3 nm to about 25 nm. Thus, the RSG 316b and the middle shield 318 collectively have a thickness 684 in the y-direction of about 13 nm to about 75 nm. Thus, as compared to the DFL TDMR read head 400 of FIG. 4, the thickness 684 is about 2 nm to about 5 nm less than the thickness 470. As such, the DTS 340 of the DFL TDMR read head 300 is less than the DTS of the DFL TDMR read head 400.

By using $SiO_2$ and/or AlOx as the RSG in a DFL TDMR read head, a seed layer need not be included, as the $SiO_2$ and/or AlOx acts as both a CMP stop layer as well as an isolation layer. As such, the DTS between the first and second readers is decreased, enabling a larger fraction of the disk to be operated in TDMR mode hence improving the performance and reliability, both magnetically and electronically, of the read head. Moreover, the capacitance of the read head may be tailored as needed, allowing flexibility in the uses of the read head.

In one embodiment, a read head comprises a first lower shield, a first sensor disposed over the first lower shield, a first upper shield disposed over the first sensor, a read separation gap disposed on the first upper shield, the read separation gap comprising $SiO_2$, wherein the read separation gap has a thickness of about 3 nm to about 25 nm, a second lower shield disposed on the read separation gap, a second sensor disposed over the second lower shield, and a second upper shield disposed over the second sensor.

The second lower shield comprises one or more of NiFe, CoB, CoFe, CoHf, IrMn, NiCr, Co, Hf, Mg, Ru, Ta, and Ti. The second lower shield has a thickness of about 10 nm to about 50 nm. A down-track spacing of the read head is about 50 nm to about 150 nm. The first upper shield, the read separation gap, and the second lower shield are substantially planar. The first sensor and the second sensor each individually comprise a first free layer and a second free layer. The read separation gap isolates the first sensor from the second sensor, and wherein the read separation gap is a chemical mechanical processing (CMP) stop layer. A magnetic recording device comprising the read head.

In another embodiment, a read head comprises a first lower shield, a first sensor disposed over the first lower shield, a first upper shield disposed over the first sensor, a read separation gap disposed on the first upper shield, the read separation gap comprising a first sublayer comprising AlOx, where x is an integer greater than or equal to 1, disposed in contact with the first upper shield and a second sublayer comprising $SiO_2$ disposed in contact with the first sublayer, wherein the read separation gap has a thickness of about 3 nm to about 25 nm, a second lower shield disposed in contact with the second sublayer of the read separation gap, a second sensor disposed over the second lower shield, and a second upper shield disposed over the second sensor.

A capacitance of the read head is based on an equation of: $C_{total} = C_{SiO2} + C_{AlOx} = (\epsilon A/d)_{SiO2} + (\epsilon A/d)_{AlOx}$, where $C_{total}$ is a total capacitance of the read head, $C_{SiO2}$ is a capacitance of $SiO_2$, $C_{AlOx}$ is a capacitance of AlOx, $\epsilon$ is a permittivity of $SiO_2$ or AlOx, A is an area of the first sublayer or the second sublayer, and d is the first thickness of the first sublayer or the second thickness of the second sublayer. The second thickness of the second is equal to or greater than about 3 nm. The second sublayer isolates the first sensor from the second sensor, and wherein the second sublayer is a chemical mechanical processing (CMP) stop layer. A down-track spacing of the read head is about 50 nm to about 150 nm, and wherein the first sensor and the second sensor each individually comprise a first free layer and a second free layer. A magnetic recording device comprising the read head.

In yet another embodiment, a read head comprises a first lower shield, a first sensor disposed over the first lower shield, a first upper shield disposed over the first sensor, a read separation gap disposed on the first upper shield, the read separation gap comprising a first sublayer comprising AlOx, where x is an integer greater than or equal to 1, disposed in contact with the first upper shield and a second sublayer comprising $SiO_2$ disposed in contact with the first sublayer, wherein the read separation gap has a thickness less than about 25 nm, and wherein the second sublayer has a first thickness equal to or greater than about 3 nm, a second lower shield disposed in contact with the second sublayer of the read separation gap, a second sensor disposed over the second lower shield, and a second upper shield disposed over the second sensor, wherein a capacitance of the read head is adjustable based on an equation of: $C_{total} = C_{SiO2} + C_{AlOx} = (\epsilon A/d)_{SiO2} + (\epsilon A/d)_{AlOx}$, where $C_{total}$ is a total capacitance of the read head, $C_{SiO2}$ is a capacitance of $SiO_2$, $C_{AlOx}$ is a capacitance of AlOx, $\epsilon$ is a permittivity of $SiO_2$ or AlOx, A is an area of the first sublayer or the second sublayer, and d is a thickness of the first sublayer or the second sublayer.

The capacitance of the read head is adjustable based on varying the first thickness of the second sublayer and a second thickness of the first sublayer. The second lower shield comprises one or more of NiFe, CoB, CoFe, CoHf, IrMn, NiCr, Co, Hf, Mg, Ru, Ta, and Ti, wherein the second lower shield has a thickness of about 10 nm to about 50 nm, and wherein a down-track spacing of the read head is about 50 nm to about 150 nm. The first sensor and the second sensor each individually comprise a first free layer and a second free layer, and wherein the read separation gap isolates the first sensor from the second sensor. A magnetic recording device comprising the read head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
a first lower shield;
a first sensor disposed over the first lower shield;
a first upper shield disposed over the first sensor;

a read separation gap disposed on the first upper shield, the read separation gap comprising a first sublayer comprising AlOx, where x is an integer greater than or equal to 1, disposed in contact with the first upper shield and a second sublayer comprising SiO₂ disposed in contact with the first sublayer, wherein the read separation gap has a thickness of about 3 nm to about 25 nm;
a second lower shield disposed in contact with the second sublayer of the read separation gap and spaced from the first sublayer of the read separation gap;
a second sensor disposed over the second lower shield; and
a second upper shield disposed over the second sensor.

2. The read head of claim 1, wherein the second lower shield comprises one or more of NiFe, CoB, CoFe, CoHf, IrMn, NiCr, Co, Hf, Mg, Ru, Ta, and Ti.

3. The read head of claim 1, wherein the second lower shield has a thickness of about 10 nm to about 50 nm.

4. The read head of claim 1, wherein a down-track spacing of the read head is about 50 nm to about 150 nm.

5. The read head of claim 1, wherein the first upper shield, the read separation gap, and the second lower shield are substantially planar.

6. The read head of claim 1, wherein the first sensor and the second sensor each individually comprises a first free layer and a second free layer.

7. The read head of claim 1, wherein the read separation gap isolates the first sensor from the second sensor, and wherein the read separation gap is a chemical mechanical processing (CMP) stop layer.

8. A magnetic recording device comprising the read head of claim 1.

9. A read head, comprising:
a first lower shield;
a first sensor disposed over the first lower shield;
a first upper shield disposed over the first sensor;
a read separation gap disposed on the first upper shield, the read separation gap comprising a first sublayer comprising AlOx, where x is an integer greater than or equal to 1, disposed in contact with the first upper shield and a second sublayer comprising SiO₂ disposed in contact with the first sublayer, wherein the read separation gap has a thickness of about 3 nm to about 25 nm, and wherein the first and second sublayers each span a length of the read separation gap in a media facing surface direction;
a second lower shield disposed in contact with the second sublayer of the read separation gap and spaced from the first sublayer of the read separation gap;
a second sensor disposed over the second lower shield; and
a second upper shield disposed over the second sensor.

10. The read head of claim 9, wherein a capacitance of the read head is based on an equation of: $C_{total} = C_{SiO2} + C_{AlOx} = (\epsilon A/d)_{SiO2} + (\epsilon A/d)_{AlOx}$, where $C_{total}$ is a total capacitance of the read head, $C_{SiO2}$ is a capacitance of SiO₂, $C_{AlOx}$ is a capacitance of AlOx, $\epsilon$ is a permittivity of SiO₂ or AlOx, A is an area of the first sublayer or the second sublayer, and d is a first thickness of the first sublayer or a second thickness of the second sublayer.

11. The read head of claim 10, wherein the second thickness of the second sublayer is equal to or greater than about 3 nm.

12. The read head of claim 9, wherein the second sublayer isolates the first sensor from the second sensor, and wherein the second sublayer is a chemical mechanical processing (CMP) stop layer.

13. The read head of claim 9, wherein a down-track spacing of the read head is about 50 nm to about 150 nm, and wherein the first sensor and the second sensor each individually comprise a first free layer and a second free layer.

14. A magnetic recording device comprising the read head of claim 9.

15. A read head, comprising:
a first lower shield;
a first sensor disposed over the first lower shield;
a first upper shield disposed over the first sensor;
a read separation gap disposed on the first upper shield, the read separation gap comprising a first sublayer comprising AlOx, where x is an integer greater than or equal to 1, disposed in contact with the first upper shield and a second sublayer comprising SiO₂ disposed in contact with the first sublayer, wherein the read separation gap has a thickness less than about 25 nm, wherein the second sublayer has a first thickness equal to or greater than about 3 nm, and wherein the first and second sublayers each span a length of the read separation gap in a media facing surface direction;
a second lower shield disposed in contact with the second sublayer of the read separation gap and spaced from the first sublayer of the read separation gap;
a second sensor disposed over the second lower shield; and
a second upper shield disposed over the second sensor,
wherein a capacitance of the read head is adjustable based on an equation of: $C_{total} = C_{SiO2} + C_{AlOx} = (\epsilon A/d)_{SiO2} + (\epsilon A/d)_{AlOx}$, where $C_{total}$ is a total capacitance of the read head, $C_{SiO2}$ is a capacitance of SiO₂, $C_{AlOx}$ is a capacitance of AlOx, $\epsilon$ is a permittivity of SiO₂ or AlOx, A is an area of the first sublayer or the second sublayer, and d is a thickness of the first sublayer or the second sublayer.

16. The read head of claim 15, wherein the capacitance of the read head is adjustable based on varying the first thickness of the second sublayer and a second thickness of the first sublayer.

17. The read head of claim 15, wherein the second lower shield comprises one or more of NiFe, CoB, CoFe, CoHf, IrMn, NiCr, Co, Hf, Mg, Ru, Ta, and Ti, wherein the second lower shield has a thickness of about 10 nm to about 50 nm, and wherein a down-track spacing of the read head is about 50 nm to about 150 nm.

18. The read head of claim 15, wherein the first sensor and the second sensor each individually comprises a first free layer and a second free layer.

19. The read head of claim 15, wherein the read separation gap isolates the first sensor from the second sensor.

20. A magnetic recording device comprising the read head of claim 15.

* * * * *